United States Patent [19]
Priaroggia et al.

[11] 3,828,114
[45] Aug. 6, 1974

[54] SYNTHETIC RESIN SLEEVE WITH EMBEDDED STRESS CONTROL SCREEN FOR HIGH-VOLTAGE CABLES

[75] Inventors: Paolo G. Priaroggia, Milan; Gabriele Maschio, Monza, both of Italy

[73] Assignee: Industrie Pirelli Societe per Azioni, Milan, Italy

[22] Filed: Feb. 15, 1973

[21] Appl. No.: 332,689

[30] Foreign Application Priority Data
Mar. 14, 1972 Italy .................................. 21795/72

[52] U.S. Cl. ............... 174/73 R, 174/19, 174/21 R, 174/142
[51] Int. Cl. ....................... H02g 15/02, H02g 15/08
[58] Field of Search ........... 174/19, 20, 21 R, 21 JS, 174/21 C, 22 R, 73 R, 73 SC, 102 SC, 142, 143

[56] References Cited
UNITED STATES PATENTS
| | | | |
|---|---|---|---|
| 2,322,702 | 6/1943 | Peterson | 174/73 SC |
| 2,967,899 | 1/1961 | Priaroggia | 174/73 R X |
| 3,049,581 | 8/1962 | Palmieri | 174/73 X |
| 3,051,770 | 8/1962 | Palmieri | 174/73 R X |
| 3,318,995 | 5/1967 | Buckley et al. | 174/73 R X |
| 3,504,106 | 3/1970 | Keto | 174/142 UX |
| 3,539,706 | 11/1970 | Buroni et al. | 174/73 R X |
| 3,761,602 | 9/1973 | De Sio et al. | 174/73 SC |

FOREIGN PATENTS OR APPLICATIONS
| | | | |
|---|---|---|---|
| 546,419 | 7/1942 | Great Britain | 174/102 SC |
| 751,292 | 1/1967 | Canada | 174/143 |

*Primary Examiner*—Laramie E. Askin
*Attorney, Agent, or Firm*—Brooks Haidt & Hoffner

[57] ABSTRACT

A sleeve of epoxy resin for use in a joint between high voltage electric cables or in a sealing end for such a cable, the sleeve having embedded therein, around the part of the cable to be electrically screened, a conductive screen embedded in semi-conductive, epoxy resin.

8 Claims, 2 Drawing Figures

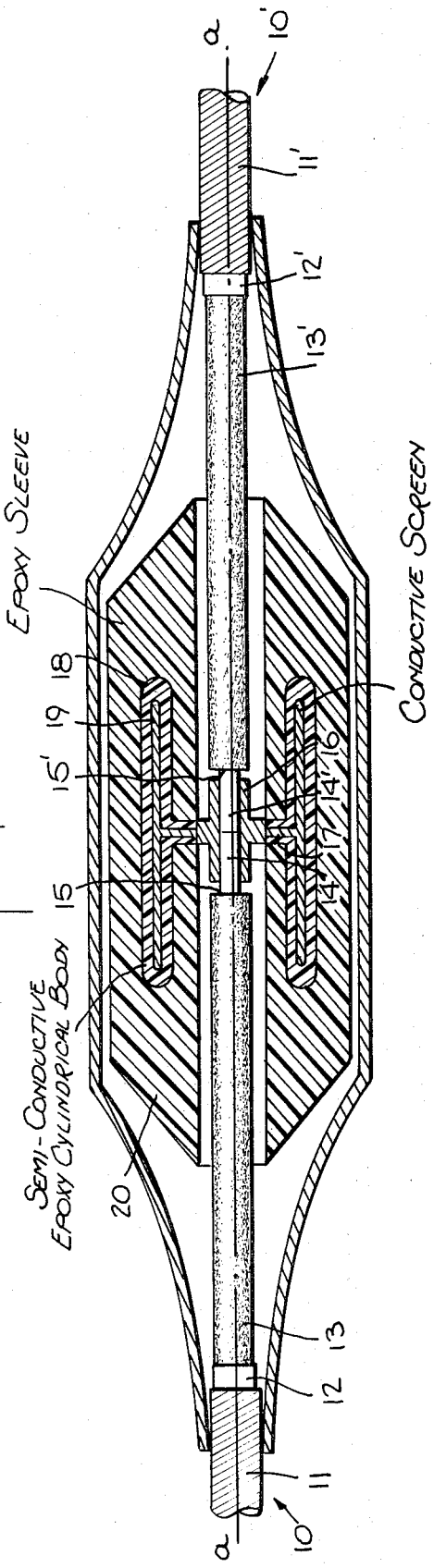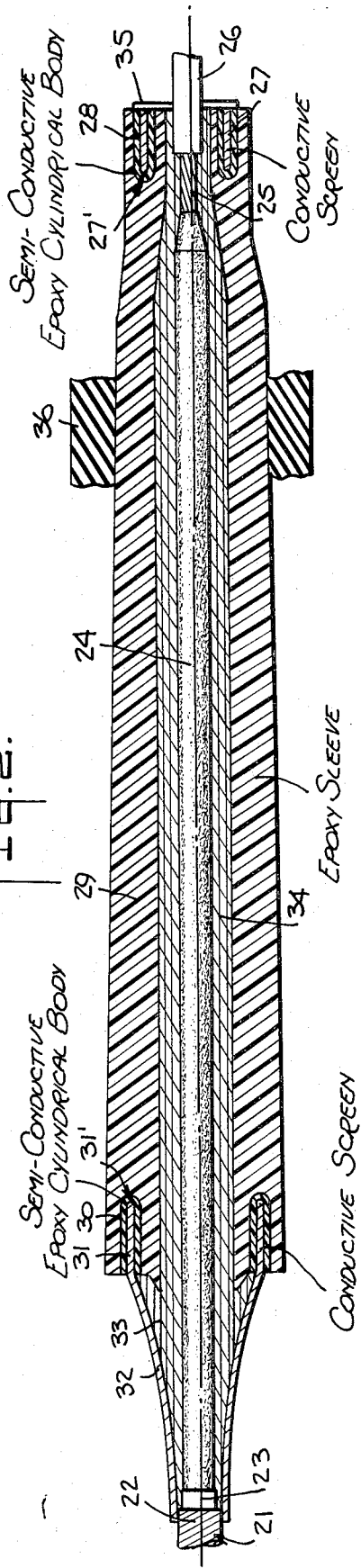

SYNTHETIC RESIN SLEEVE WITH EMBEDDED STRESS CONTROL SCREEN FOR HIGH-VOLTAGE CABLES

The present invention relates to improvements in the prefabricated, monolithic, dielectric portion, made primarily of synthetic resin, of accessories, e.g., joints and sealing ends, for high-voltage, electric cables, in particular, for cables impregnated with fluid, e.g., oil-filled cables.

The use of a monolithic, dielectric, prefabricated sleeve, made of a synthetic resin having a high dielectric strength and low dielectric losses, has been known for a long time in the field of accessories for high-voltage cables. Said resin preferably is an ethylene oxide, or its homologues such as, for example, the ethoxylinic or epoxy resins, in some cases loaded with inorganic fillers (quartz, kaolin, etc.), to which the appropriate hardening agents are added.

The sleeve has such a shape and size as to occupy the portions of the accessory which are particularly critical from the point of view of the electric field, and in which it is necessary to provide a stress-control means for the electric field.

Usually, at least a hollow cylinder of a good-conductivity metallic material, having screening or stress-control functions, is embedded co-axially in the sleeve.

As is known, there are two types of stress-control means, namely, an earthed or ground potential stress-control means, which serves to terminate the screening of the cable core, or of other armors in case such are provided and individually insulated, at the entrance of the accessory, and a voltage stress-control means, which is at the same voltage as the conductor and screens electrically the end of the conductor (in a sealing end) or of the conductors (in a joint), the ferrule, and sometimes the cut portion of the insulation in proximity to the ferrule.

In a prefabricated sleeve of synthetic resin, good adhesion between the resin and the stress-control means is a critical factor. For example, the phenomena of internal tensions which can take place in the material during its shrinkage while curing, or relative movements which can occur between the metallic elements embedded in the resin and the mass of resin itself, in consequence of different coefficients of linear thermal expansion for the two materials, can cause detachment of the stress-control from the resin sleeve, and therefore, cause cavities between the resin and the stress-control means which, as is known, have a low dielectric strength.

The stress-control means are subjected to high potential gradients which, in the event of such detachment, cause a strong ionization in the cavity subject to the high gradient, creating electrical discharges which may damage the accessory and even perforate it.

The present invention has, as one object, the provision of a cable, or other electrical, accessory in which the adhesion of the material constituting the dielectric to the stress-control means is such as to exclude the formation of any cavity in the insulating material, but in which, in the event of the possible formation of cavities adjacent any metallic stress-control means, said cavities are screened, and are therefore unable to cause the above-mentioned drawbacks.

In particular, the object of the present invention is to provide an improved cable accessory provided with a monolithic dielectric made of synthetic resin and having the shape of a sleeve, which contains at least a cylindrical hollow metallic stress-control means co-axial to it, characterized in that said stress-control means is embedded in at least a cylindrical body of synthetic resin made semi-conductive by the addition of appropriate fillers, said body being in turn embedded in said monolithic dielectric. In the preferred embodiment of the invention, the semi-conductive cylindrical body of synthetic resin has a resistivity less than $10^8$ ohms per meter.

The objects and advantages of the invention will be better understood from the following description of the presently preferred embodiment thereof, which description should be considered in conjunction with the accompanying drawings, in which:

FIG. 1 illustrates in longitudinal section an improved accessory in accordance with the invention, in the form of a joint for connecting high-voltage cables; and FIG. 2 illustrates in longitudinal section an improved accessory in accordance with the invention, in the form of a sealing end applied to a high-voltage electric cable.

The accessory represented in FIG. 1 is a normal joint between two cable lengths 10 and 10', identical to each other, and has the task of connecting said cable lengths 10, 10', belonging to the same phase of a power line.

The two cable lengths 10, 10' are respectively provided with screening layers 11, 11' and with a sheath 12, 12', partially cut away to show the insulation 13, 13', which, in the proximity of a ferrule 16, is removed, which leaves sharp cuts 15 and 15' perpendicular to the cable axis $a$—$a$, to bare the respective conductors 14, 14'.

The ferrule 16, mounted on the conductors 14, 14', connects mechanically and electrically the conductors of the two cable ends 10, 10'. The ferrule 16 preferably is constituted by a metallic cylinder and is surrounded by a sleeve 20 made of synthetic resin having a high dielectric strength and low dielectric losses and preferably made from an epoxy resin. Obviously, the ferrule 16 can be of another known type different from that illustrated.

The sleeve 20 contains a metallic cylinder or stress-control means 19 of good conductivity, co-axial to it, which screens possible irregularities of the electric field due to the ferrule 16 and the sharp cut ends 15, 15' of the insulation 13, 13', respectively. The stress-control means 19 may be a solid sleeve of copper or a sleeve of copper mesh. The stress-control means 19 is conductively connected to the ferrule 16 by means of the transversal extension 17 having annular shape. Therefore, the stress-control element 19 is at the same voltage as the ferrule 16, and hence, as the conductors 14, 14'.

The stress-control means 19 and its transversal annular extension 17 are embedded in a cylindrical body 18 of synthetic resin, made semi-conductive by means of appropriate fillers, hereinafter mentioned, the resistivity of which preferably is smaller than $10^8$ ohms per meter. The cylindrical body 18 preferably is shaped appropriately so as to follow the shape of the stress-control means 19 and of its extension 17, although it is not necessary that the extension 17 be embedded in the resin which is semi-conductive, and instead, it may be embedded in resin of the sleeve 20.

In turn, the cylindrical body 18 is embedded in the sleeve 20 of insulating synthetic resin. In a preferred embodiment, the resin of the cylindrical body 18 and the resin of the sleeve 20 are the same, for instance epoxy resin. However, the epoxy resin of the body 18 contains fillers which make it semi-conductive, whereas such fillers are absent from the epoxy resin of the sleeve 20 so that the resistance thereof is much higher than that of the body 18.

Conductive black, known in the trade as "carbon black," graphite or metallic powders preferably are employed as fillers to render semi-conductive the synthetic resin constituting the cylindrical body 18.

The improved accessory according to the invention is illustrated in FIG. 1 in its application to a normal cable joint, but it will be understood by those skilled in the art that the improvement could be applied to other types of joints for high-voltage cables, for example, to stop joints for oil-filled cables.

FIG. 2 represents in longitudinal section, an alternative embodiment in the form of an accessory for terminating a high-voltage electric cable mounted on the free end of a cable 21. Both a screening layer 22 and a sheath 23 have been removed from said free end, and a part of the insulation 24 has also been removed in the proximity of a ferrule 26 to bare a stranded conductor 25.

The cable length, where it is devoid of the screen 22 and of the sheath 23 and the conductor 25, as far as in the proximity of the ferrule 26, is covered by a winding 34 made of tapes or sheets of insulating material, such as normal crepe paper, impregnated with insulating oils. Said winding 34 is subsequently enclosed by the monolithic dielectric or prefabricated sleeve 29 of synthetic resin. A thickening layer 33, constituted by tapes wound around the cable, which tapers in the form of a frustum of cone towards the screen 22 of the cable 21 and which is intended to support the stress-control cone 32, extends from the larger base of the sleeve 29 as far as said screen 22 of the cable.

The stress-control cone 32 is connected at one end with the screen 22, which is earthed, and at the other end to the first stress-control means 31, which is at earth or ground potential. The free end 31' of the stress-control means 31 is rounded in order to reduce the concentration of the electric gradient thereat.

The stress-control means 31 has a cylindrical form, is co-axial with the sleeve 29 and is embedded in a cylindrical body 30 of synthetic resin made semi-conductive by means of an appropriate filler. The cylindrical body 30 is embedded in turn in the base of said sleeve 29 of synthetic resin.

In the proximity of the other base of said sleeve 29 of synthetic resin, there is embedded a second cylindrical body 28 of synthetic resin, made semi-conductive by an appropriate filler. Said body 28 carries, embedded in it, a stress-control means 27, having a cylindrical shape and co-axial with the sleeve 29. The end 27' of the means 27 is rounded to reduce the concentration of the electric gradient thereat.

The stress-control means 27 is an electrode at high potential, because, by means of its extension 35, it is connected to the ferrule 26 and is, therefore, at the same potential as the conductor 25.

The example of FIG. 2 illustrates an accessory for a sealing end, in which a single sleeve comprises both the earth stress-control means and the stress-control means or voltage electrode. However, it is obvious to those skilled in this field that the accessory could comprise two sleeves, each containing a stress-control means and surrounding part of the cable end around the corresponding portion to be screened. Also, it is possible to provide only one sleeve containing just the earth stress-control means, the electrode 27 and its associated body 28 being omitted.

In use, the end represented in FIG. 2 must be enclosed, in a conventional manner, by an insulator, for instance, an insulator 36 of porcelain, tightly surrounding the cable and the sleeve 29, only a small portion of the insulator 36 being shown in FIG. 2.

In each of the illustrated embodiments, both the monolithic dielectric or prefabricated sleeve (20, 29) and the cylindrical body (18, 28, 30) which is made semi-conductive by means of an appropriate filler are made from a synthetic resin and, preferably, by the same synthetic resin (for instance, epoxy resin), it is possible to ensure a perfect adhesion between the surrounding portion (namely the monolithic, dielectric sleeve 20 or 29 of synthetic resin) and the embedded portion (semi-conductive cylindrical body 18, 28 or 30).

The improvement according to the invention, besides providing a good adhesion, offers reliability in other respects. Thus, if because of an incorrect pouring or the occurrence of internal tensions, due, for example, to the different behavior with thermal changes of the material constituting the metallic stress-control means and the cylindrical body of semi-conductive resin, cavities should be formed in the proximity of the former, such cavities will be screened by the cylindrical body of semi-conductive resin by virtue of its comparatively low resistivity.

Although preferred embodiments of the present invention have been described and illustrated, it will be understood by those skilled in the art that various modifications may be made without departing from the principles of the invention.

What is claimed is:

1. In an electrical accessory to be subjected to high-voltage and having a rigid monolithic, insulating sleeve made of a thermoset, synthetic resin, said sleeve having a longitudinally extending central bore surrounded by an inner surface of said sleeve and having an outer surface spaced outwardly from said inner surface thereof and said sleeve also having a hollow, cylindrical and conductive electric stress control means in the wall of said sleeve and co-axial with said bore, said means being disposed outwardly of said bore with at least a portion of said sleeve intermediate said means and said bore and having its outer surface spaced inwardly from said outer surface of said sleeve, the improvement comprising a rigid body of semi-conductive, thermoset, synthetic resin having substantially the same physical characteristics including thermal expansion coefficient as said sleeve disposed intermediate at least said outer surface of said stress control means and said sleeve, the outer surface of said body being adhered to the material of said sleeve and the inner surface thereof contacting said stress control means.

2. An accessory as set forth in claim 1, in which said body has a resistivity less than $10^8$ ohms per meter.

3. An accessory as set forth in claim 1, wherein said body comprises a synthetic resin having admixed therein particles of conductive material.

4. An accessory as set forth in claim 3, wherein said particles are selected from the group consisting of carbon black, graphite and metal particles and mixtures of at least two thereof.

5. An accessory as set forth in claim 1, wherein the synthetic resin of said sleeve is the same as the synthetic resin of said body.

6. An accessory as set forth in claim 5, wherein said synthetic resin is an epoxy resin.

7. An accessory as set forth in claim 1, wherein at least one end of said stress-control means is rounded.

8. An accessory as set forth in claim 1, wherein said body is also between at least one end and the inner surfaces of said stress control means and said sleeve.

* * * * *